United States Patent
Yanagisawa et al.

(10) Patent No.: US 7,400,073 B2
(45) Date of Patent: Jul. 15, 2008

(54) MOTOR TERMINAL PORTION STRUCTURE

(75) Inventors: Takeshi Yanagisawa, Saitama (JP); Kuniaki Arakawa, Saitama (JP); Takeshi Kitajima, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 143 days.

(21) Appl. No.: 11/429,999

(22) Filed: May 9, 2006

(65) Prior Publication Data

US 2006/0258540 A1 Nov. 16, 2006

(30) Foreign Application Priority Data

May 11, 2005 (JP) ............................. 2005-138372

(51) Int. Cl.
*H02K 5/22* (2006.01)

(52) U.S. Cl. .......................................... 310/71; 310/85

(58) Field of Classification Search .................... 310/71, 310/85, 88
See application file for complete search history.

(56) References Cited

U.S. PATENT DOCUMENTS

2005/0073204 A1* 4/2005 Puterbaugh et al. ........... 310/89

FOREIGN PATENT DOCUMENTS

| GB | 2178603 A | * | 2/1987 |
| JP | 3027900 B2 | | 2/2000 |
| JP | 2007124844 A | * | 5/2007 |

* cited by examiner

*Primary Examiner*—Tran Nguyen
(74) *Attorney, Agent, or Firm*—Birch, Stewart, Kolasch & Birch, LLP (57) ABSTRACT

A motor terminal portion structure is provided which can satisfactorily drain the water in an insulating member surrounding the outer circumference of a terminal and prevent water from entering the insulating member, in addition to allowing the insulating member to be commoditized without being influenced by motor layout. A motor terminal portion structure includes an insulator that is formed in a cylindrical shape surrounding the outer circumference of a terminal and is secured to a bracket. A drain hole is provided to establish communication between the inside and outside of the insulator. A flange portion shields an opening of the drain hole on the outside of the insulator. A plurality of the drain holes are disposed around the terminal. The outer side surface of the insulator and the inside surface of the flange portion are each formed in regular polygon so as to conform to each other. A portion of the flange portion facing vertically downward in an on-board state is formed as a notch.

19 Claims, 6 Drawing Sheets

MOTOR TERMINAL PORTION STRUCTURE

CROSS-REFERENCE TO RELATED APPLICATIONS

This nonprovisional application claims priority under 35 U.S.C. § 119(a) on Patent Application No. 2005-138372, filed in Japan on May 11, 2005, the entirety of which is incorporated herein by reference.

BACKGROUND OF THE INVENTION

1. Field of the Invention

The present invention relates to a terminal portion structure of a motor mounted on a vehicle.

2. Description of Background Art

In Japanese Patent Laid-Open No. 3027900, a conventional terminal structure is configured such that a dish-like insulator (insulating member) is attached to a terminal of an alternator (motor) and is formed with drainage slits (drain holes) at four outer circumferential positions thereof.

Draining the water in the insulating member through the drain holes needs to expose at least part of the drain holes through an insulating cap attached to the insulating member. If the exposed part of the drain holes faces upward in terms of the motor layout; however, water may enter the insulating member through the drain hole.

In this case, it is conceivable to change the positions of the drain holes of the insulating member in accordance with the motor layout. However, this makes it inevitable to provide a plurality of different types of insulating members, which is unpreferable in terms of commoditizing parts.

SUMMARY OF THE INVENTION

Accordingly, it is an object of the present invention to provide a motor terminal portion structure that is capable of satisfactorily draining the water in an insulating member surrounding the outer circumference of a terminal and is capable of preventing water from entering the insulating member, in addition to allowing the insulating member to be commoditized without being influenced by motor layout.

As means for solving the problem, a first aspect of the present invention is directed to a motor terminal portion structure in which a terminal (e.g., the terminal 11 of the embodiment) is projectingly provided on a bracket (e.g., the bracket 6 of the embodiment) constituting one side of a motor (e.g., the motor 1 of the embodiment). An insulating member (e.g., the insulator 20, 40 of the embodiment) is formed in a cylindrical shape surrounding the outer circumference of the terminal and is secured to the bracket. A drain hole (e.g., the drain hole 28 of the embodiment) is provided to establish communication between the inside and outside of the insulating member. A flange portion (e.g., the flange portion 30 of the embodiment) shields an opening (e.g., the opening 29 of the embodiment) of the drain hole on the outside of the insulating member.

With this configuration, the opening of the drain hole on the outside of the insulating member is shielded by the flange portion. Therefore, the insulating member is prevented from being exposed. Thus, even if the periphery of the insulating member is splashed with water, the water can be prevented from entering the inside of the insulating member. It should be noted that the motor described above can be a generator as well as an electric motor.

According to a second aspect of the present invention, the insulating member has an outside flat portion (e.g., the out-side flat portion 21b of the embodiment) on an outside surface (e.g., the outer circumferential surface 21a) thereof. The flange portion is formed integral with the bracket and has an inside flat portion (e.g., the inside flat portion 30b of the embodiment) on an inside surface (e.g., the inside surface 30a of the embodiment) thereof. The inside flat portion conforms to the outside flat portion.

With this configuration, when the outside flat portion of the insulating member and the inside flat portion of the flange portion are conformably fitted to each other, they function as a lock when the insulating member is secured to the bracket. Thus, assembling of the insulating member can be enhanced. In addition, the flange portion is formed integral with the bracket. Therefore, the number of components can be reduced as compared with when the flange portion is formed as a single piece.

According to a third aspect of the present invention, the insulating member is formed on one side thereof with a slit (e.g., the slit 24 of the embodiment) for connection with an external terminal (e.g., the external terminal 14) to be connected to the terminal and a plurality of the drain holes are arranged radially around the terminal.

With this configuration, the plurality of drain holes are radially arranged in the insulator. Therefore, even if the insulator is shared by motors that are different from each other in the terminal connection direction, drainage can be ensured. In other words, in addition to the fact that the insulator can be shared by a plurality of motors, the drainage of the insulator can be ensured.

According to a fourth aspect of the present invention, the outside surface of the insulating member is formed in a polygonal shape comprising a plurality of outside flat portions. The flange portion is disposed around the polygonal shape to conform thereto and the flange portion has a notch (e.g., the notch 31 of the embodiment) at a portion facing vertically downward in an on-board state.

With this configuration, locking can be ensured when the insulator is secured to the bracket. Furthermore, in addition to that fact that the vertical-downward drainage in the on-board state can be ensured, water can be prevented from entering the inside of the insulator when the periphery of the insulator is splashed with the water.

According to a fifth aspect of the present invention, an attachment portion (e.g., the attachment portion 7 of the embodiment) is provided to attach the motor to a vehicle at a position under the notch of the flange portion and is formed with an eave.

With this configuration, even if the motor is removed from the vehicle, it is possible to prevent water or dust from entering the inside of the insulator from the drain hole exposed from the inside of the notch since the eaved attachment portion is provided on the side (the lower side in the on-board state) where the notch of the flange portion is provided.

According to the first aspect of the present invention, even if the periphery of the insulating member is splashed with water, the water can be prevented from entering the inside of the insulating member.

According to the second aspect of the present invention, assembling of the insulating member can be enhanced, and the number of components can be reduced as compared with when the flange portion is formed as a single piece.

According to the third aspect of the present invention, in addition to the fact that the insulator can be shared by a plurality of motors, the drainage of the insulator can be ensured.

According to the fourth aspect of the present invention, locking of the insulator can be ensured. Furthermore, in addition to that fact that the drainage of the insulating member can be ensured, water can be prevented from entering the inside of the insulator.

According to the fifth aspect of the present invention, even if the motor is removed from the vehicle, it is possible to prevent water or dust from entering the inside of the insulator from the drain hole.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Preferred embodiments of the present invention will now be described with reference to the accompanying drawings, wherein the same or similar elements will be identified with the same reference numerals.

Figure 1:
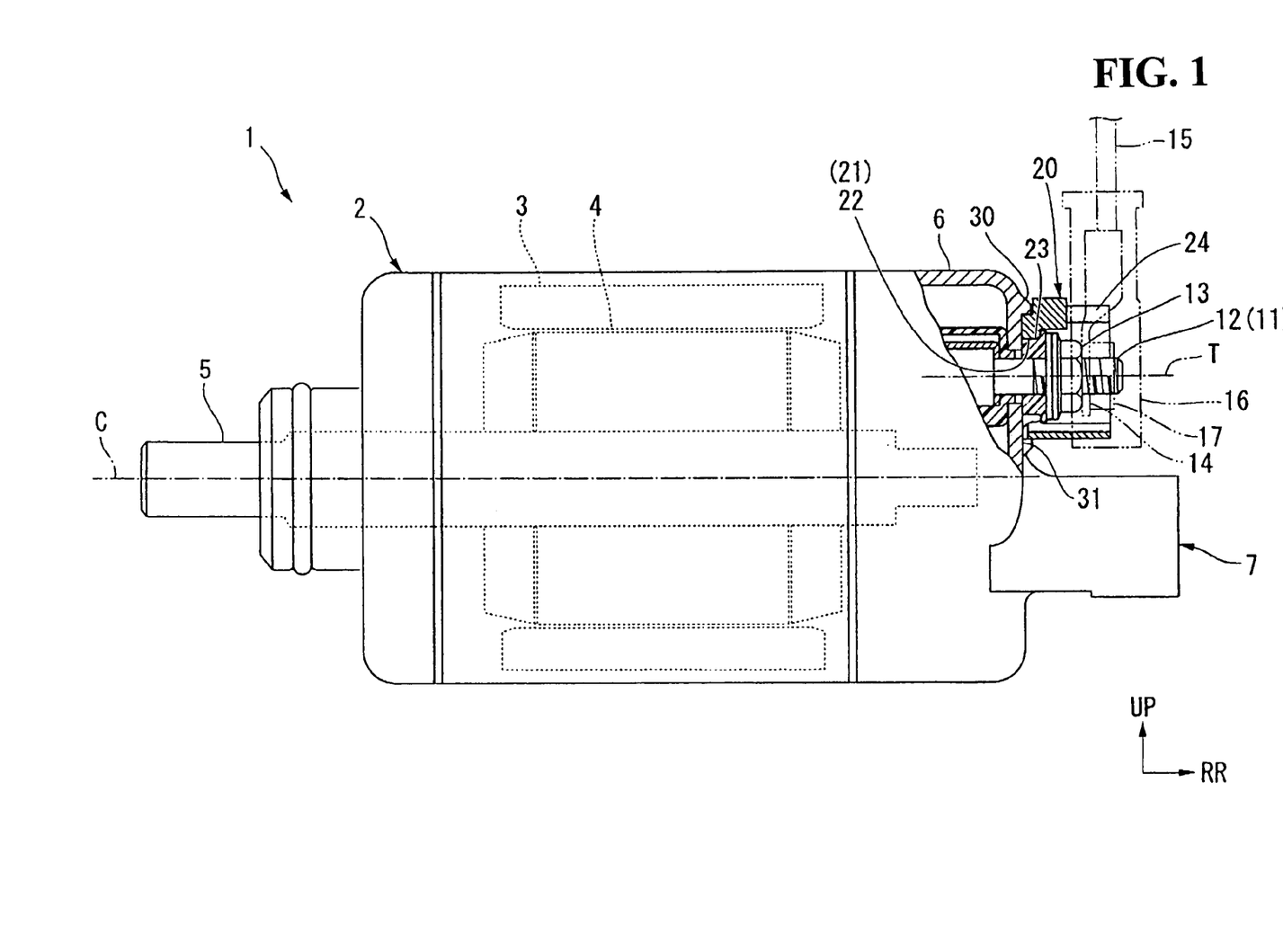
FIG. 1 is a side view of a motor according to an embodiment of the present invention.
Figure 2:
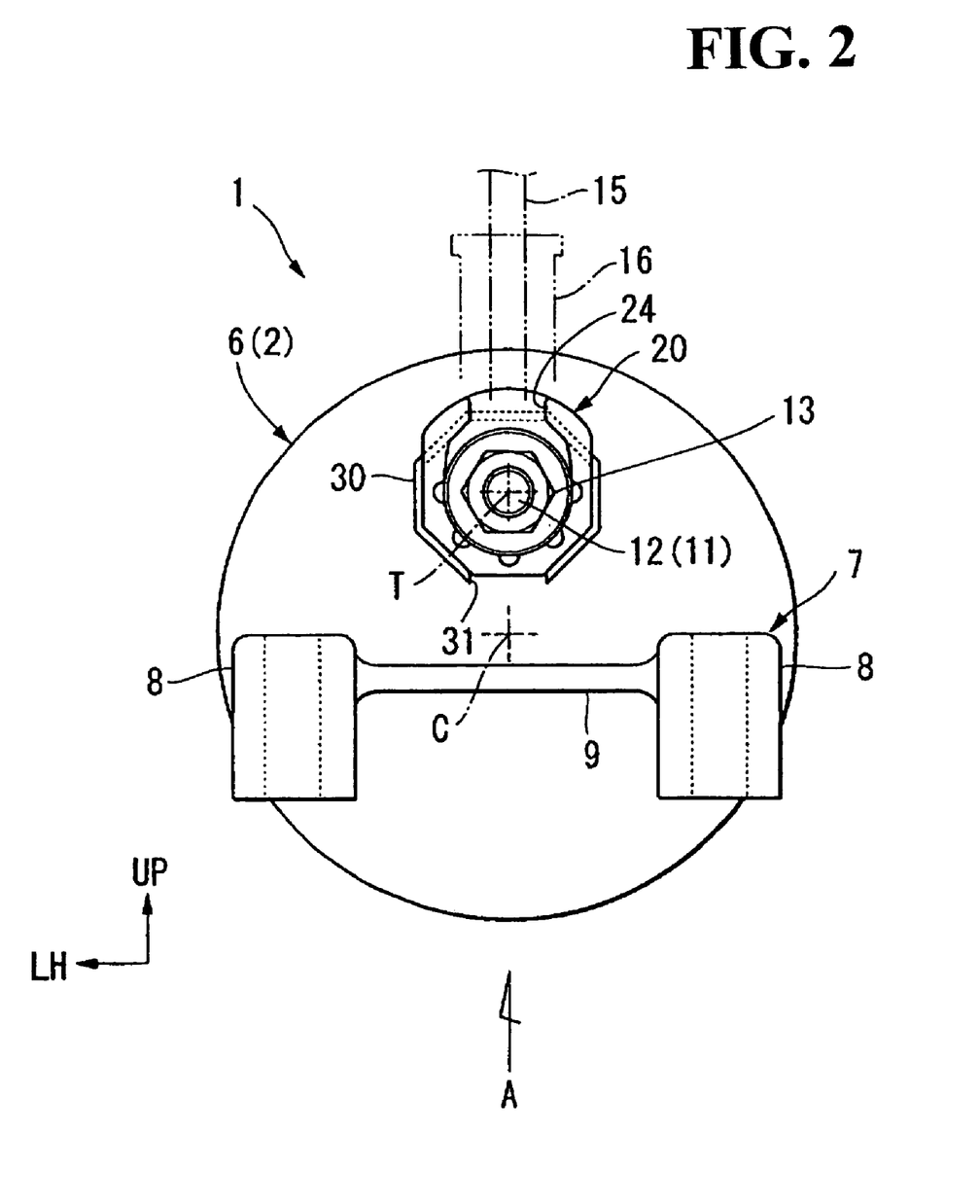
FIG. 2 is a rear view of the motor.
Figure 3:
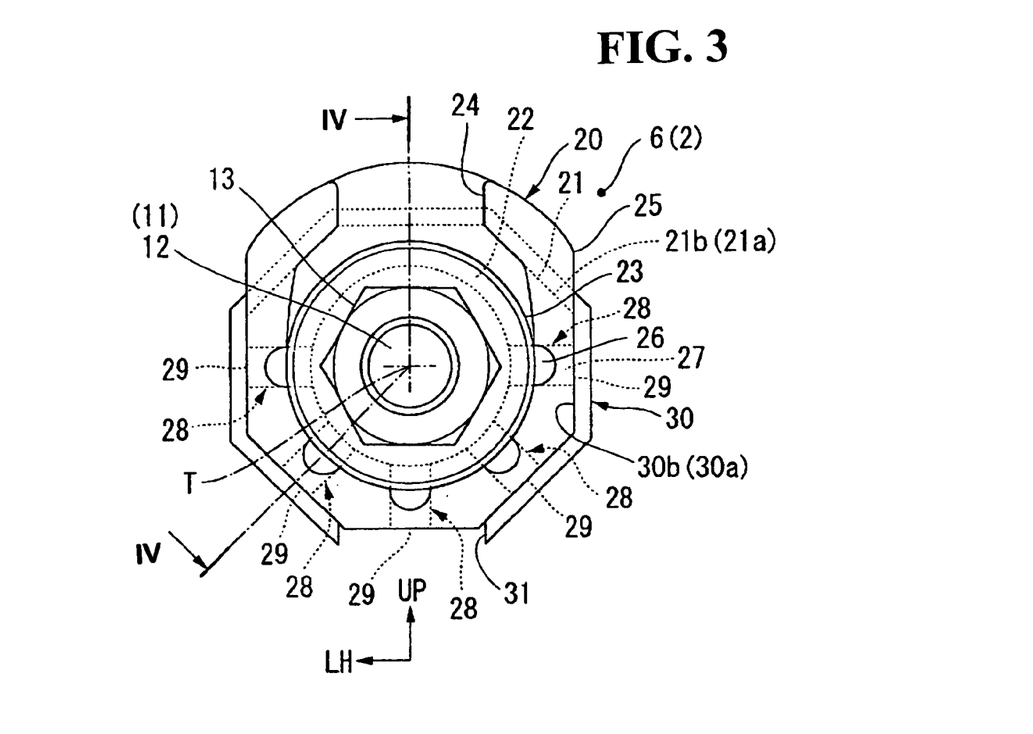
FIG. 3 is an enlarged view of an essential portion of FIG. 2.
Figure 4:
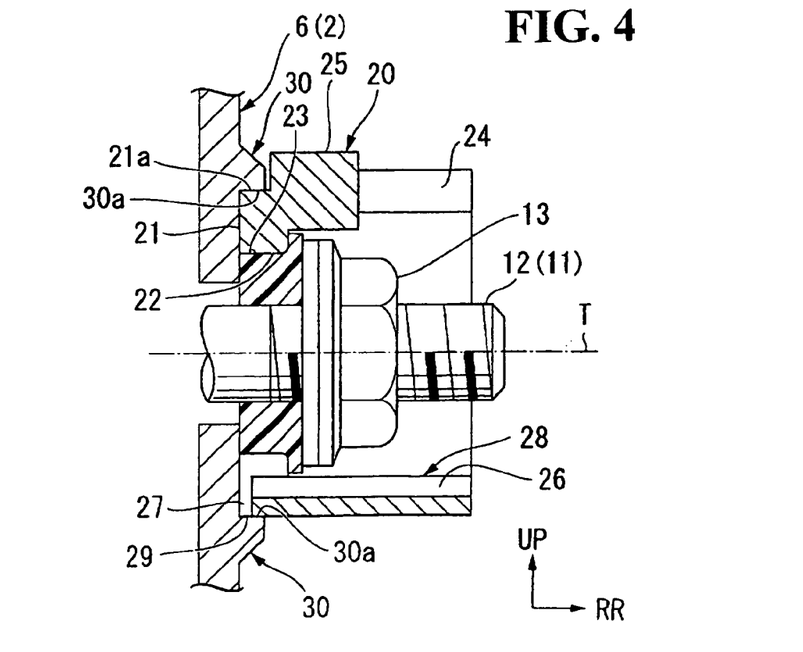
FIG. 4 is a cross-sectional view taken along line IV-IV of FIG. 3.
Figure 5:
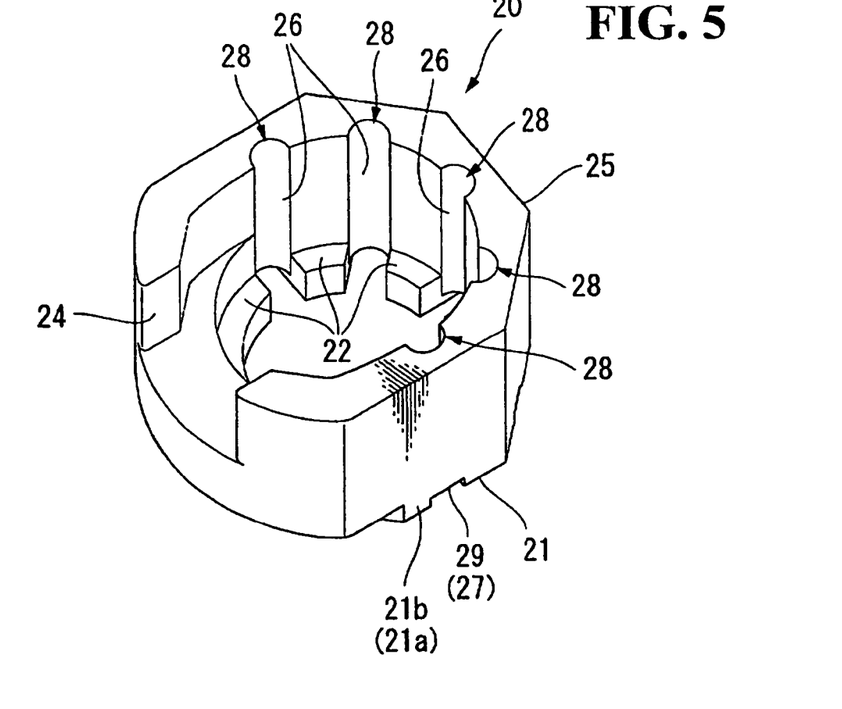
FIG. 5 is a perspective view of an insulator of the motor terminal portion described above, as viewed from obliquely above.
Figure 6:
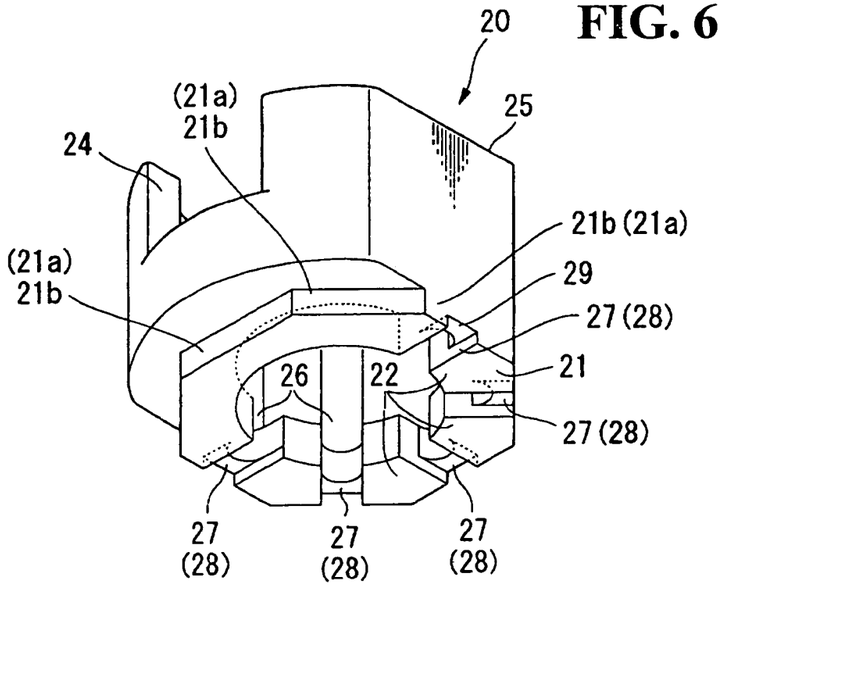
FIG. 6 is a perspective view of the insulator as viewed from obliquely below.

A motor 1 shown in FIGS. 1 and 2 is a starter motor for a motorcycle, for instance. The motor 1 includes an almost-cylindrical casing 2. A stator 3 is secured in the inside of and on the outer circumferential side of the casing 2. A rotor 4 is disposed for rotation on the inner circumferential side of the casing 2. The rotor 4 is integrally connected to a rotary shaft 5 that passes therethrough. The rotary shaft 5 is carried for rotation by the casing 2.

When electric power from an on-board battery is fed to the motor 1, the rotor 4 and rotary shaft 5 are drivingly rotated integrally. Such a motor 1 is mounted to the vehicle with its rotary axis C being parallel thereto. It should be noted that the following description is made on the assumption that arrow RR in the figures denotes the rearward direction (axial direction) along the rotary shaft C when the motor 1 is mounted on the vehicle; arrow UP denotes an up-and-down direction when the motor 1 is mounted on the vehicle; and arrow LH denotes the left direction as viewed forward (as viewed in FIG. 2) taken along the axial direction when the motor 1 is mounted on the vehicle.

An attachment portion 7 is provided at the rear end of the casing 2 to attach the rear portion of the motor 1 to the vehicle. The rear end of the casing 2 is configured as a bracket 6 formed integral with the attachment portion 7. A terminal 11 for connection with the positive electrode of the on-board battery is provided above the bracket 6 so as to project rearward along the motor rotary axis C. The bracket 6 is made of metal and the attachment portion 7 is joined to the vehicle body to ground the motor 1.

The terminal 11 is such that the neck-under-portion of the terminal bolt 12 that passes through the rear wall of the bracket 6 from the inside of the casing 2 projects rearward. The terminal bolt 12 and a nut 13 threaded thereto are fastened with the rear wall of the bracket 6. An insulating member such as an insulator 20 or the like is located therebetween. Thus, the bracket 6 and the terminal bolt 12 and the nut 13 are joined together while the insulation therebetween is maintained. It should be noted that the symbol T in the figure denotes the axis of the terminal 11.

The insulator 20 is made of an insulating resin. In addition, the insulator 20 is cylindrical and is disposed to surround the outer circumference of the terminal 11. The insulator 20 has a front end 21 formed with a shelf portion 22 projecting to the inner circumferential side. A collar 23 is fittingly attached, from the rear, to the opening of the shelf portion 22 on the inner circumferential side. The collar 23 is made similarly of an insulating resin and has a flange in contact, from the rear, with the shelf portion 22. The terminal bolt 12 and the nut 13 are fastened while the respective front ends of the collar 23 and insulator 20 are in contact with the rear surface of the bracket 6. Thus, the collar 23 and insulator 20 are secured to the bracket 6 together with the terminal bolt 12 and nut 13.

FIGS. 1 to 4 illustrate an example in which an external terminal 14 secured to the terminal 11 with a nut 17 and a harness 15 connected to the external terminal 14 extend above the terminal 11. With such a motor layout, the insulator 20 is provided at an upper part with a slit 24 that is adapted to extend the external terminal 14 and the harness 15 from the terminal 11 inside the insulator 20.

An insulating cap 16 that is adapted to shield the periphery of the external terminal 14 is attached to a tip of the harness 15. The insulating cap 16 is mounted to the rear end of the insulator 20. Thus, the opening of the rear end and the slit 24 are closed, and the peripheries of the terminal 11 and the external terminal 14 are covered with the insulator 20 and the collar 23, and the insulating cap 16 so as to be insulated from the outside.

With additional reference to FIGS. 3 to 6, the shelf portion 22 at the front end 21 of the insulator 20 has an inside surface (inner circumferential surface) which is in a circular shape concentric with the terminal axis T as viewed axially. In addition, the shelf portion 22 has an outside surface (outer circumferential surface) 21a which is in an octagonal shape concentric with the inside surface as viewed axially.

The insulator 20 has a portion (hereinafter referred to as an outer wall 25) excluding the front end 21. The lower half of the outer wall 25 is formed with an outside surface shaped in a polygon, as viewed axially, conforming to the external profile of the front end 21. An inside surface of the outer wall 25 is shaped in a semicircle as viewed axially.

The upper half of the external wall 25 is formed to have a circular arc-shaped outside surface at a portion protruding upward from the outer profile of the front end 21 as viewed axially. A widthwise center region of an upper wall forming the circular arc-shaped outside surface, which region is rearward of the axial substantial center of the insulator 20, is cut away to form the slit 24.

Drains 26 that are used to drain water that has entered the insulator 20 to the outside are formed at both or left and right side portions, a lower portion, and a portion between each of the left and right side portions and the lower portion, in the inside surface of the external wall 25. More specifically, the drains 26 are disposed around the terminal axis T in the lower half of the insulator 20, and are each formed semicircular in section and extend axially.

The drains 26 are each formed to entirely extend from the rear end to the front end 21 of the insulator 20. With such a configuration, the respective portions, of the shelf portion 22, corresponding to the drains 26 are each cut away at a width equal to that of the drain 26 to be open toward the inner circumferential side.

A front end drain 27 extending from the inside surface to the outside surface 21a of the front end 21 is formed at a portion corresponding to each of the drains 26 at the front end of the insulator 20. Consequently, even when the insulator 20 is fixed, the inside and outside of the insulator 20 communicate with each other through the drains 26 and the front end drains 27, thereby draining the water in the insulator 20 to the outside. In other words, the drains 26 are each paired with a corresponding one of the front end drains 27 to form a drain hole 28 of the insulator 20.

The bracket 6 is provided at a rear surface with a projecting flange portion 30 extending along the outside surface 21a of the front end 21 included in the insulator 20 so as to surround it. The flange portion 30 is provided so that an inside surface (inner circumferential surface) 30a may be conformably fitted to the outside surface 21a of the front end 21. More specifically, the outside surface 21a of the front end 21 is formed in an octagon, as viewed axially, composed of eight outside flat portions 21b. On the other hand, the inside surface 30a of the flange portion 30 is formed in an octagon, as viewed axially, composed of eight inside flat portions 30b corresponding to the respective outside flat portions 21b. Since the front end 21 is fitted in the flange portion 30 thus formed, the insulator 20 is locked when the nut 13 is fastened to secure the insulator 20 to the bracket 6.

Additionally, with the insulator 20 secured to the bracket 6, the flange portion 30 is provided to shield the opening 29 of each drain hole 28 on the outside surface 21a of the front end 21. However, a notch 31 is formed at a portion, of the flange portion 30, facing vertically downward with the motor 1 mounted on the vehicle so as to expose to the outside only an opening 29 that faces vertically downward when the motor 1 is mounted on the vehicle.

Figure 7:
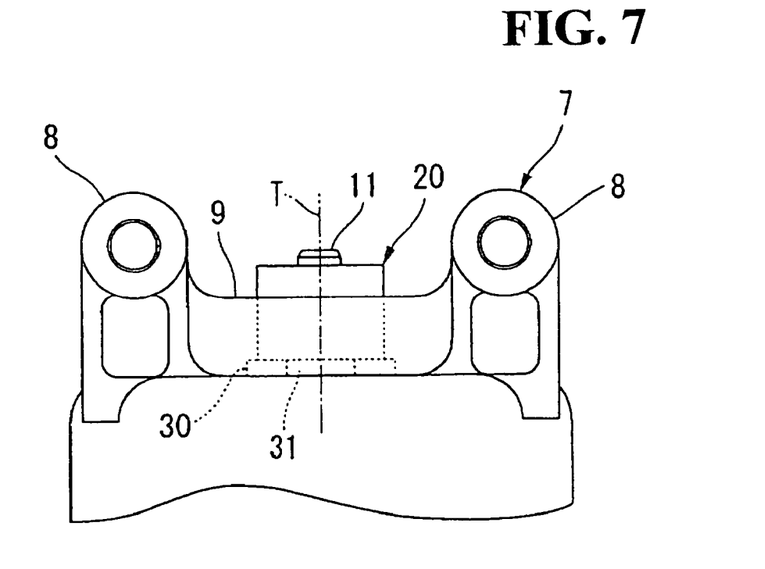
FIG. 7 is a view as viewed from arrow A of FIG. 2.

As shown in FIGS. 2 and 7, the attachment portion 7 provided on the rear surface of the bracket 6 includes a pair of bosses 8 which is disposed on both respective sides of a portion under the terminal 11. An eaved portion 9 extends from the rear surface of the bracket 6 so as to span between the bosses 8. The bosses 8 are each formed to allow a bolt to pass therethrough in the up-and-down direction. In addition, the plate-like eaved portion 9 spans between both the bosses 8 so as to be substantially perpendicular to both bosses 8. The attachment portion 7 described above shields, as viewed from below, the notch 31 of the flange portion 30 and the opening 29 of the drain hole 28 that is exposed from the inside of the notch 31.

Figure 8:
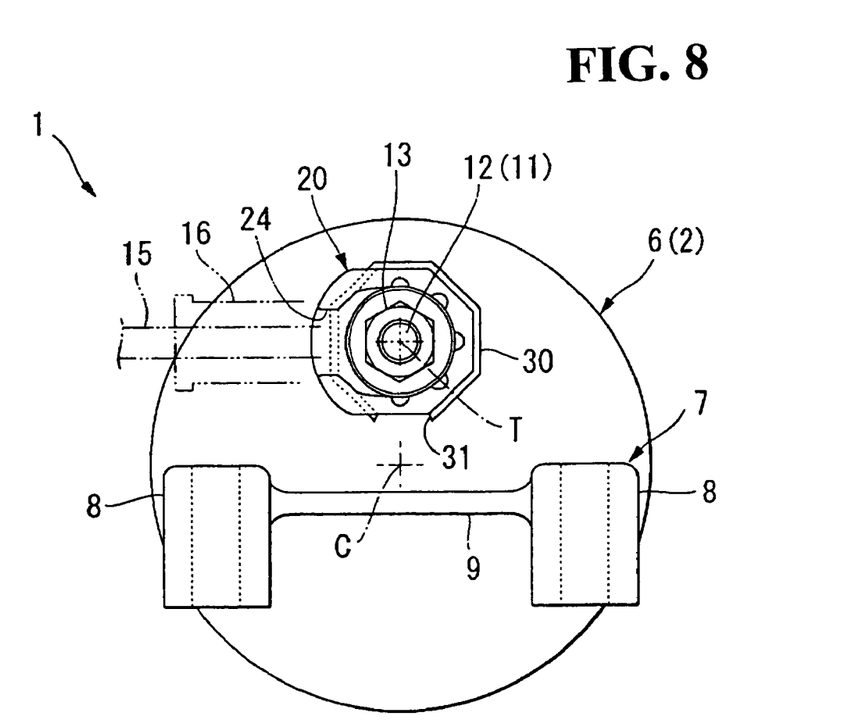
FIG. 8 is a rear view corresponding to FIG. 2, with the extending direction of the motor harness changed.

FIG. 8 illustrates a motor layout in which the external terminal 14 and the harness 15 extend leftward of the terminal 11. With such a motor layout, the insulator 20 is secured to the bracket 6 to turn at an angle of 90° counterclockwise around the terminal axis T from the state as shown in FIG. 2 (the state where the slit 24 faces the upside). Since the front end 21 and the flange portion 30 fitted to each other are formed to be octagonal as viewed axially, they are fitted to each other even when the insulator 20 is turned as mentioned above. That is to say, the front end 21 and the flange portion 30 function as a lock for the insulator 20 at the time of fastening the nut 13.

If the front end 21 and the flange portion 30 are formed to be octagonal as viewed axially, the rotary angle of the insulator 20 is a unit of 45 degrees. However, the rotary angle is arbitrarily changeable by the shape of the front end 21 and flange portion 30.

In addition, if the insulator 20 is turned as mentioned above as well, the drain hole 28 that was located at the left-hand end in FIG. 2 is located at the lower end so as to be exposed vertically downward from the notch 31 of the flange portion 30. Consequently, the same drainage performance as that of the motor layout shown in FIG. 2 can be ensured.

As described above, the motor terminal portion structure according to the embodiment is such that the terminal 11 is projectingly provided on the bracket 6 constituting one side of the motor 1. In addition, the motor terminal portion structure includes the insulator 20 secured to the bracket 6 so as to be in a cylindrical shape surrounding the outer circumference of the terminal 11. The drain holes 28 are provided in the insulator 20 so as to establish communication between the inside and outside thereof. The flange portion 30 shields the openings 29 of the drain holes 28 on the outside of the insulator 20.

With this configuration, the openings 29 of the drain holes 28 on the outside of the insulator 20 are shielded by the flange portion 30. Therefore, the exposure of the openings 29 can be prevented. Even when the periphery of the insulator 20 is splashed with water, the water can be prevented from entering the inside of the insulator 20. Thus, the terminal 11 and the nut 13 can be prevented from rusting and electrically corroding.

In the motor terminal portion structure, while the insulator 20 has outside flat portions 21b on the outside surface 21a of the front end 21 thereof, the bracket 6 is formed integrally with the flange portion 30 and the flange portion 30 is provided on its inside surface 30a with an inside flat portion 30b conforming to the outside flat portion 21b. Therefore, when the outside flat portion 21b of the insulator 20 and the inside flat portion 30b of the flange portion 30 are conformably fitted to each other, they function as a lock when the insulator 20 is secured to the bracket 6. This improves the assembly of the insulator 20. In addition, since the flange portion 30 is formed integral with the bracket 6, the number of components can be reduced as compared with when the flange portion 30 is formed as a separate part.

Furthermore, in the motor terminal portion structure, while the insulator 20 is formed on its one side with the slit 24 used for connection with the external terminal 14 to be connected to the terminal 11, a plurality of the drain holes 28 are radially disposed around the terminal 11. Therefore, even if the insulator 20 is shared by different motors in the external terminal connection direction, drainage can be ensured since the plurality of drain holes 28 are radially arranged. In other words, in addition to the fact that the insulator 20 can be shared by a plurality of motors, the drainage of the insulator 20 can be ensured.

In the motor terminal portion structure, while the outside surface 21a of the insulator 20 is formed in a regular polygon formed of a plurality of the outside flat portions 21b, the flange portion 30 is disposed around the polygon so as to conform thereto. That is, the inner circumferential surface of the flange portion 30 is formed in a regular polygon formed of a plurality of the inside flat portions 30b conforming to the outside flat portions 21b. In addition, a portion of the flange portion 30 facing vertically downward in an on-board state is formed as the notch 31. Therefore, locking can be ensured when the insulator 20 is secured to the bracket 6. In addition to that fact that the vertical-downward drainage performance in the on-board state can be ensured, water can be prevented from entering the inside of the insulator 20 when the periphery of the insulator 20 is splashed with the water. Since the insulator 20 can be turned for each specified angle, design freedom with regard to the connection direction to the external terminal can be increased.

Additionally, with the motor terminal portion structure described above, the attachment portion 7 used to attach the motor 1 to the vehicle is provided under the notch 31 of the flange portion 30 and is formed to be eaved. Therefore, even if the motor 1 is removed from the vehicle, it is possible to prevent water or dust from entering the inside of the insulator 20 through the drain hole 28 exposed from the inside of the notch 31 since the eaved attachment portion 7 is provided on the side (the lower side in the on-board state) where the notch 31 of the flange portion 30 is provided.

Figure 9:
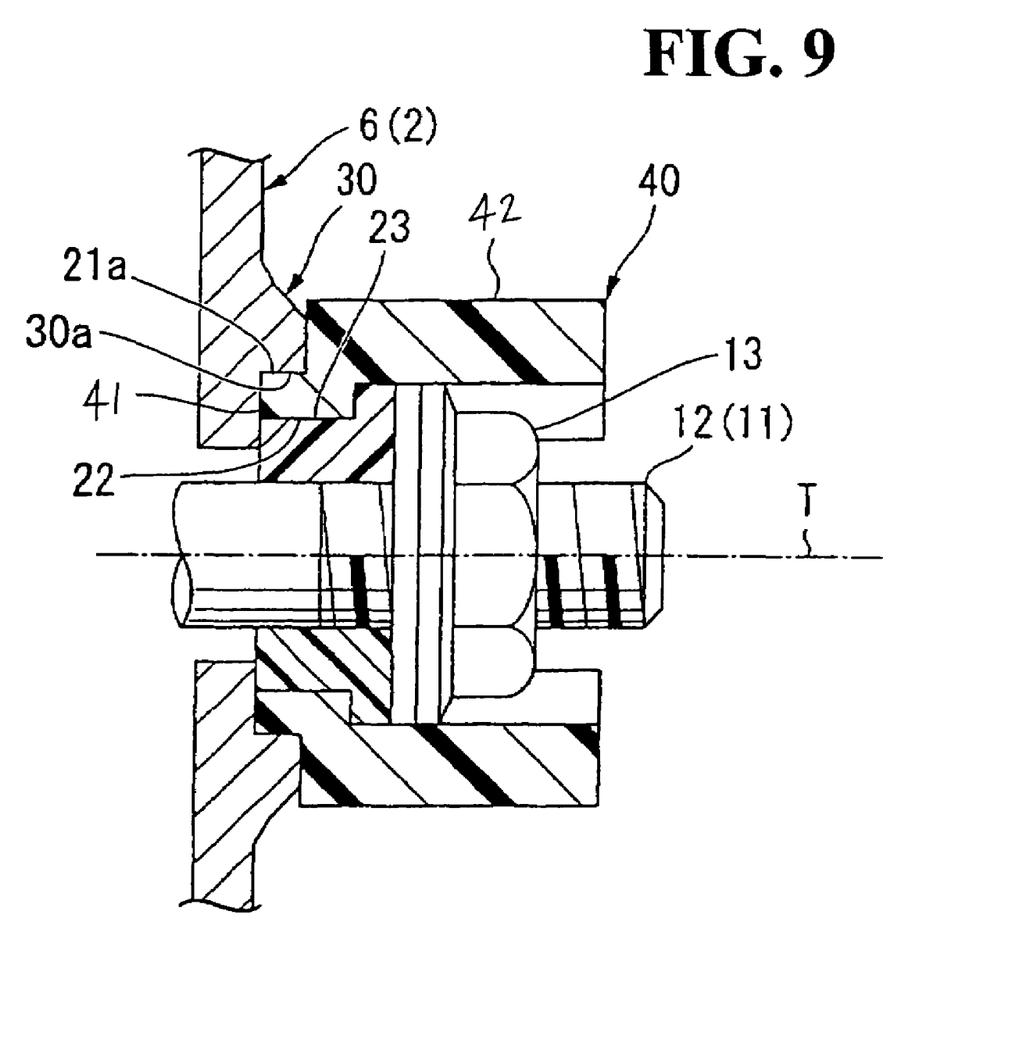
FIG. 9 is a cross-sectional view corresponding to FIG. 4, showing a modified example of the motor terminal portion.

The present invention is not limited to the embodiment described above. For example, as an insulator 40 shown in FIG. 9, a front end 41 (not shown in the figure) may be set to a size smaller than the external shape of an outer wall 42 (not shown in the figure). In this case, the flange portion 30 of a bracket 6 is also reduced in size to suit with the front end 41, so that applicability to the small-sized motor can be enhanced. It should be noted again that portions corresponding to those in the embodiment described above are denoted with the same reference numerals and its explanation is omitted.

In addition, the insulator 20 and the terminal 11 may be configured to be separately secured to the bracket 6. Furthermore, the flange portion 30 may be formed integral with or separate from the insulator 20.

The configuration of the embodiment described above is one example of the invention, is applicable to a motor (electric motor) as well as a generator (electric dynamo), and needless to say, can be variously modified without departing from the gist of the invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A motor terminal portion structure, comprising:
   a terminal projecting from a bracket on one side of a motor;
   an insulating member formed in a cylindrical shape, said insulating member surrounding the outer circumference of the terminal and being secured to the bracket;
   a drain hole provided to establish communication between the inside and outside of the insulating member; and
   a flange portion that shields an opening of the drain hole on the outside of the insulating member.

2. The motor terminal portion structure according to claim 1, wherein the insulating member has an outside flat portion on an outside surface thereof, the flange portion is formed integral with the bracket and has an inside flat portion on an inside surface thereof, and the inside flat portion conforms to the outside flat portion.

3. The motor terminal portion structure according to claim 1, wherein the insulating member is formed on one side thereof with a slit for connection with an external terminal to be connected to the terminal and a plurality of the drain holes are arranged radially around the terminal.

4. The motor terminal portion structure according to claim 2, wherein the insulating member is formed on one side thereof with a slit for connection with an external terminal to be connected to the terminal and a plurality of the drain holes are arranged radially around the terminal.

5. The motor terminal portion structure according to claim 3, wherein the outside surface of the insulating member is formed in a polygonal shape comprising a plurality of outside flat portions, the flange portion is disposed around the polygonal shape to conform thereto and the flange portion has a notch at a portion facing vertically downward in an on-board state.

6. The motor terminal portion structure according to claim 4, wherein the outside surface of the insulating member is formed in a polygonal shape comprising a plurality of outside flat portions, the flange portion is disposed around the polygonal shape to conform thereto and the flange portion has a notch at a portion facing vertically downward in an on-board state.

7. The motor terminal portion structure according to claim 5, wherein an attachment portion is provided to attach the motor to a vehicle at a position under the notch of the flange portion and is formed eaved.

8. The motor terminal portion structure according to claim 6, wherein an attachment portion is provided to attach the motor to a vehicle at a position under the notch of the flange portion and is formed eaved.

9. The motor terminal portion structure according to claim 1, wherein there are a plurality of said drain hole, the plurality of drain holes being spaced from each other circumferentially around said insulating member.

10. The motor terminal portion structure according to claim 9, wherein said flange portion closes an opening of all of the plurality of drain holes except a bottommost drain hole of the plurality of drain holes.

11. A motor terminal portion structure that covers a terminal projecting from a motor, said motor terminal portion structure comprising:
    an insulating member formed in a cylindrical shape, said insulating member surrounding the outer circumference of the terminal;
    a plurality of drain holes provided to establish communication between the inside and outside of the insulating member, said plurality of drain holes being spaced circumferentially around the insulating member; and
    a flange portion that closes an opening of each of the plurality of drain holes, except for a bottommost drain hole of the plurality of drain holes.

12. The motor terminal portion structure according to claim 11, wherein the insulating member has an outside flat portion on an outside surface thereof, the flange portion has an inside flat portion on an inside surface thereof, and the inside flat portion conforms to the outside flat portion.

13. The motor terminal portion structure according to claim 11, wherein the insulating member is formed on one side thereof with a slit for connection with an external terminal to be connected to the terminal.

14. The motor terminal portion structure according to claim 12, wherein the insulating member is formed on one side thereof with a slit for connection with an external terminal to be connected to the terminal.

15. The motor terminal portion structure according to claim 13, wherein the outside surface of the insulating member is formed in a polygonal shape comprising a plurality of outside flat portions, the flange portion is disposed around the polygonal shape to conform thereto and the flange portion has a notch at a portion facing vertically downward in an on-board state, said notch being aligned with the bottommost drain hole to allow for drainage therethrough.

16. The motor terminal portion structure according to claim 14, wherein the outside surface of the insulating member is formed in a polygonal shape comprising a plurality of outside flat portions, the flange portion is disposed around the polygonal shape to conform thereto and the flange portion has a notch at a portion facing vertically downward in an on-board state, said notch being aligned with the bottommost drain hole to allow for drainage therethrough.

17. The motor terminal portion structure according to claim 15, wherein an attachment portion is provided to attach the motor to a vehicle at a position under the notch of the flange portion and is formed eaved.

18. The motor terminal portion structure according to claim 16, wherein an attachment portion is provided to attach the motor to a vehicle at a position under the notch of the flange portion and is formed eaved.

19. A motor, comprising:

a casing;

a stator mounted within said casing;

a rotary shaft mounted for rotation within said casing;

a rotor mounted on said rotary shaft for rotation therewith;

a terminal projecting from the casing;

an insulating member formed in a cylindrical shape, said insulating member surrounding the outer circumference of the terminal casing;

a drain hole provided to establish communication between the inside and outside of the insulating member; and a flange portion that shields an opening of the drain hole on the outside of the insulating member.

* * * * *